G. GIUGLIANO.
CLASP.
APPLICATION FILED JUNE 26, 1912.
1,099,437.
Patented June 9, 1914.
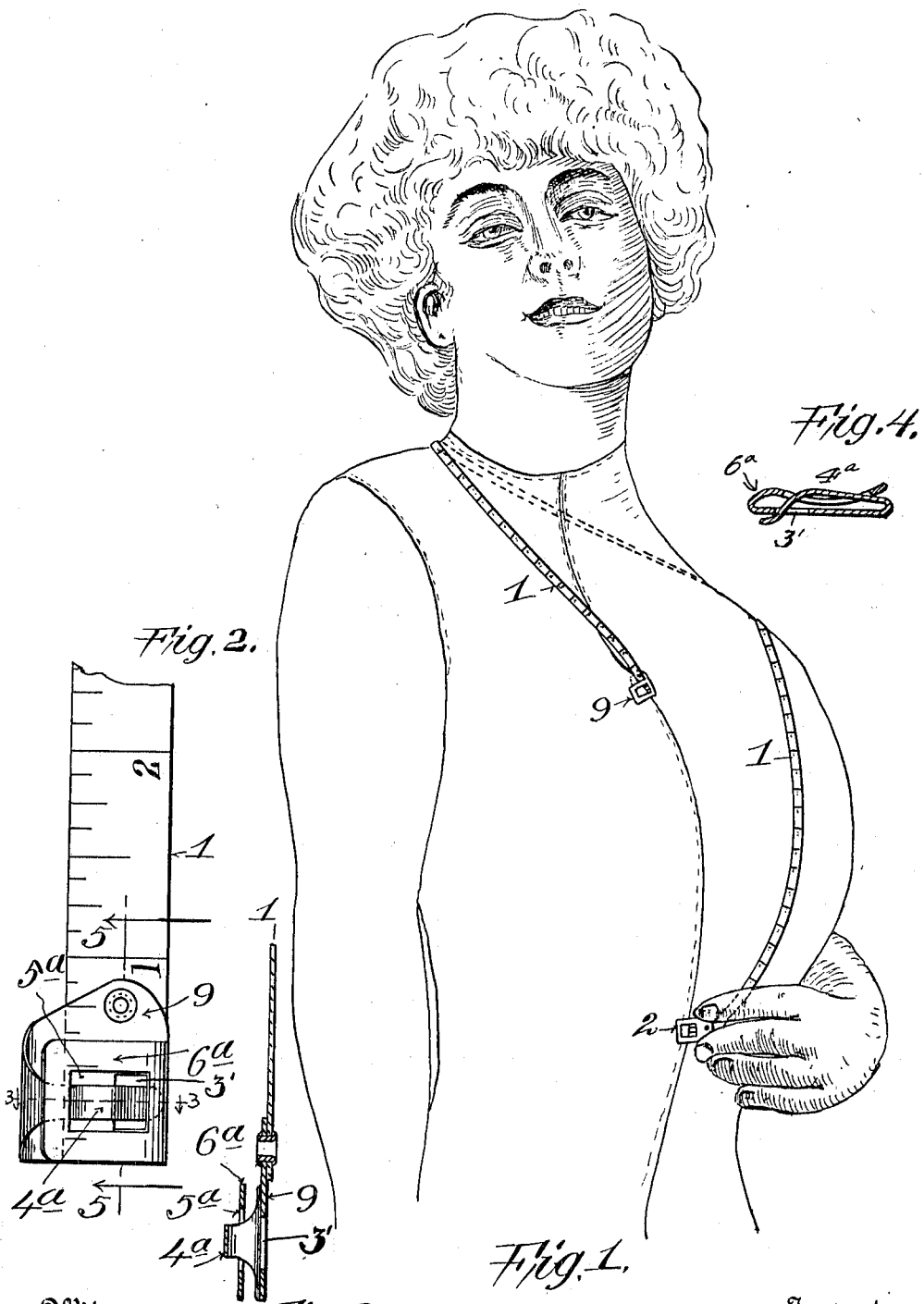

UNITED STATES PATENT OFFICE.

GENNARO GIUGLIANO, OF WEST HOBOKEN, NEW JERSEY.

CLASP.

1,099,437.  Specification of Letters Patent.  Patented June 9, 1914.

Application filed June 26, 1912. Serial No. 706,087.

*To all whom it may concern:*

Be it known that I, GENNARO GIUGLIANO, a citizen of the United States, and resident of West Hoboken, in the county of Hudson and State of New Jersey, have invented certain new and useful Improvements in Clasps, of which the following is a specification.

The object of my invention is to provide a clasp to be used in combination with articles such as tags, labels or the like.

As shown by the drawing my invention is applied to the ends of a tape measure for holding the ends thereof when measuring articles of apparel whereby an end of the tape measure may be attached to such articles, leaving one end of the tape measure free to be manipulated as required in obtaining the desired measurements from the end of the measure that is attached to the article.

My invention also comprises novel details of improvement and combinations of parts that will be more fully hereinafter set forth and then pointed out in the claim.

Reference is to be had to the accompanying drawings forming part hereof, wherein, Figure 1 is a perspective view illustrating one manner of using my improved clasp; Fig. 2 is a face view of a portion of one end of a tape measure with my invention applied thereto. Fig. 3 is a sectional view taken on line 5—5 of Fig. 2, and Fig. 4 is a sectional view taken on line 3—3 of Fig. 2.

Similar numerals of reference indicate corresponding parts in the several views.

In the drawing my invention is shown as applied to a tape measure which may be of any well known structure having the indicating divisions. At one end of the tape measure is shown my form of clasp which may be constructed of any suitable metal. As shown the clasp comprises a base 9 of sheet metal having an opening 3′ and an apertured tongue 6ª which is a continuation of one of the side edges of the base and is formed so that the tongue is spaced from and overlaps the base to provide an opening to permit the passage of material under the tongue. A movable tongue 4ª which is also a continuation of the base has the central portion thereof constructed so that it will extend through the aperture 5ª in the tongue 6ª so that the tongues will coöperate and form clamping jaws. The free end of the tongue 4ª is shown by Fig. 4 as terminating in a relatively straight portion and extending through the opening 3′ formed in the base portion. It is obvious that the portion extending through the opening 3′ forms an efficient finger piece to be grasped by the operator when the clasp is to be released from the article to which it is applied, and after the tongue has been released, it again attains its normal position due to the fact that the tongue is formed of flexible metal. It is obvious that this structure forms a clasp which will allow the goods to which it is applied to be passed edgewise of the tape measure between the tongues, and that by operating the tongue 6ª the jaws may be spread to permit insertion of the goods to be measured.

With a tape measure constructed according to my invention, any portion of the tape measure may be attached to an end thereof by one of the catches, which would be useful in various ways, for instance, as with tailors, when they place the tape measure around their shoulders the free portions may be detachably connected together to be retained upon the person; for general measuring an end of the tape measure may be attached to an article to be measured, leaving both hands free to manipulate the clasp for laying the same at the desired point or points, and where different parts of the body are to be measured for garments, such as illustrated in Fig. 1, the catch 9 having its open jaws extended laterally with respect to the tape measure may be applied at any part or edge of the garment, and then the tape measure may be carried over the shoulders in front of the bust and attached to another part of the garment; or the measure may be attached by one of its catches to the neck portion or upper part of the garment and be carried downwardly, to measure the length, or for sleeve lengths, etc. The measure is also convenient by placing it around the waist and attaching a required portion of the measure to one of the catches, to determine the exact waist line from which measurements may be taken, as for measuring the length of a skirt, trousers, etc. An advantage of my improved tape measure lies in the fact that the measure may be attached where desired leaving both hands free to manipulate the measure, overcoming the requirements with ordinary tape measures to hold the measure with both hands, which is somewhat difficult where relatively long measurements are to be made.

Having now described my invention what I claim is:—

In a device of the character described, a plate having an extension adapted for attachment to a tape measure, an apertured tongue forming a continuation of the plate at one edge, said tongue overlying the plate in a direction at right angles to the said extension; said plate having an aperture under the aperture of the tongue, a second tongue member forming a continuation of the plate at the edge opposite the first mentioned tongue, said second mentioned tongue extending across the plate under the first mentioned tongue and having a curved portion extending into the opening of the first mentioned tongue, the end of the second mentioned tongue extending through the opening of the plate and constituting a finger grasp for the manipulation of the said second mentioned tongue.

Signed at New York city, in the county of New York and State of New York, this 24th day of June, A. D. 1912.

GENNARO GIUGLIANO.

Witnesses:
T. F. BOURNE,
MARIE F. WAINRIGHT.

Copies of this patent may be obtained for five cents each, by addressing the "Commissioner of Patents, Washington, D. C."